United States Patent [19]
Deremo

[11] Patent Number: 5,062,746
[45] Date of Patent: Nov. 5, 1991

[54] CLAMPING ATTACHMENT FOR PORTABLE DRILLS

[75] Inventor: Edwin J. Deremo, Lexington, S.C.

[73] Assignee: Cooper Industries, Inc., Houston, Tex.

[21] Appl. No.: 664,701

[22] Filed: Mar. 5, 1991

[51] Int. Cl.$^5$ .............................................. B23B 45/14
[52] U.S. Cl. ........................................ 408/79; 408/95
[58] Field of Search ........................... 408/79, 95, 103

[56] References Cited

U.S. PATENT DOCUMENTS

| | | | |
|---|---|---|---|
| 2,963,927 | 12/1960 | Hanger | 408/79 |
| 3,599,958 | 8/1971 | Schindler | 408/79 |
| 3,663,115 | 5/1972 | Vindez et al. | 408/79 |
| 4,286,902 | 9/1981 | Gagliano et al. | 408/79 |
| 4,396,318 | 8/1983 | Jensen et al. | 408/79 |

*Primary Examiner*—Daniel W. Howell
*Attorney, Agent, or Firm*—Eddie E. Scott; Alan R. Thiele; Nelson A. Blish

[57] ABSTRACT

An attachment for clamping a portable drill to a work piece includes a foot member which positions a portable drill with respect to a work piece. A contact pad applies pressure to the surface of the work piece. Located between the contact pad and the means for engagement of the portable drill is a guide path in which a housing is slidably mounted. Affixed to the housing is a means for applying a vertical force and a collet member. Said means being anti-back drivable. The vertical force is applied to a mandrel so that the mandrel expands the collet. Once the collet has been expanded, a force is placed on the contact pad and on the means for engaging the portable drill. Consequently, the portable drill is held in place at the desired location for drilling a finish hole using minimal force.

3 Claims, 1 Drawing Sheet

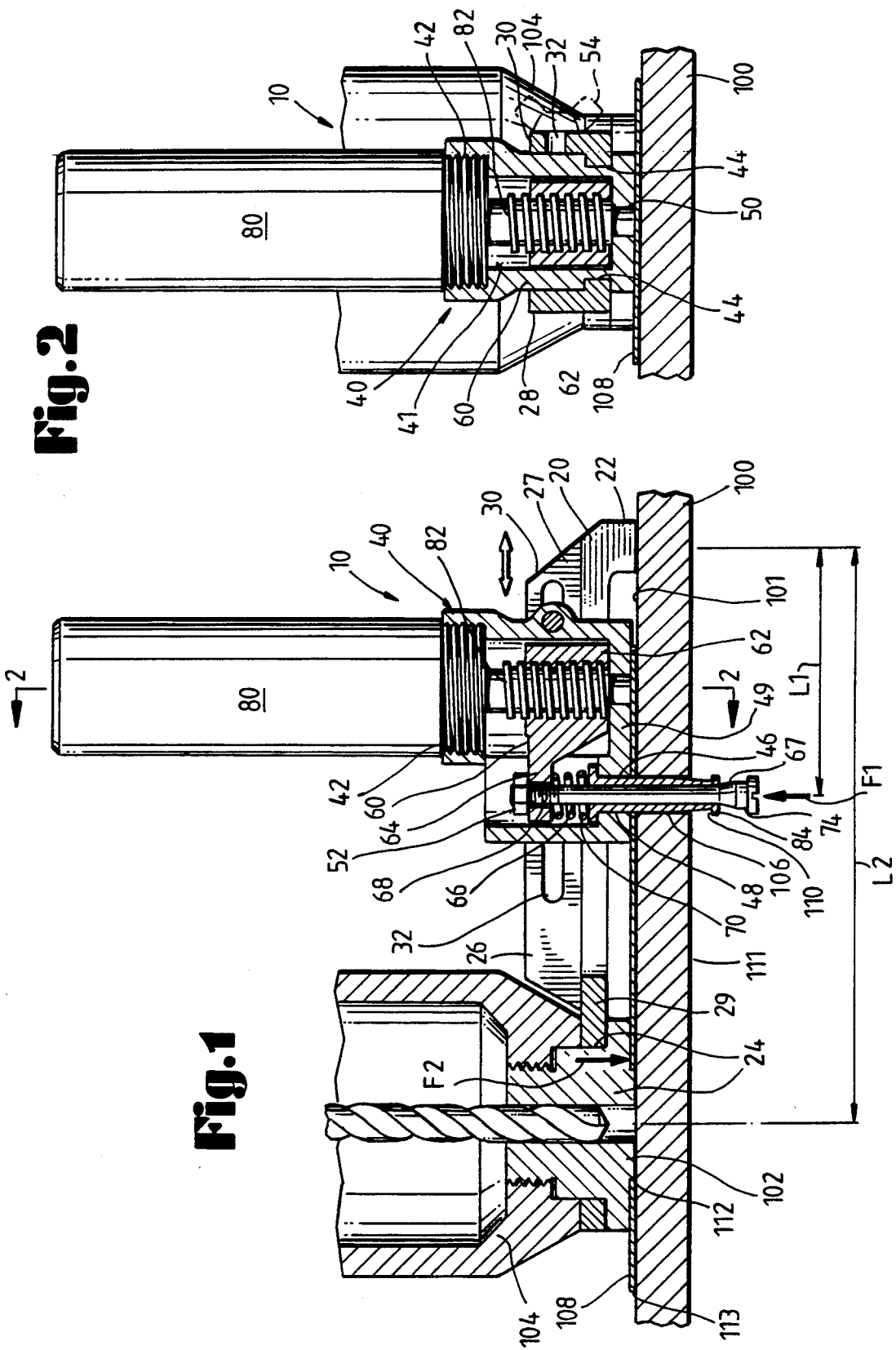

CLAMPING ATTACHMENT FOR PORTABLE DRILLS

BACKGROUND OF THE INVENTION

The present invention relates to a device and method for selectively clamping portable drills to work pieces; more particularly, the device of the present invention pertains to a device and method for clamping a portable drill to a work piece wherein holes are drilled in the work piece by reference to a pilot hole using a hole locating template.

Because of the increasing use of exotic and composite materials in many industrial applications, the task of accurately positioning portable hole drills with respect to a work piece without marring the surface of the work piece has become increasingly important and more difficult. One of the more common methods for positioning a portable drill with respect to a work piece begins with accurately positioning a pilot hole in the work piece. The remaining holes are formed by positioning the portable drill with respect to the accurately positioned pilot hole. In devices employing this method of hole location, a fixture for a portable drill is mounted on the work piece starting at the pilot hole. The pattern for the remainder of the holes to be drilled is laid out by use of a template. Once the drill clamping device and template have been located with respect to the pilot hole, the portable drill is positioned by reference to the template.

One of the drawbacks of this prior art portable drill locating system is the excessive force that has been required of the drill clamping fixture to hold the portable drill assembly in proper position for the drilling of the finish holes located by the template. These excessive forces are required because the unit can be back-driven. Such excessive clamping forces may mar the surface of the work piece or may actually deform the hole so that the work piece becomes unusable.

There is, therefore, a need in the art for a device which will position a portable drill for drilling finish holes in work pieces yet will exert only a minimum amount of force on a work piece. In the language of the trade, such devices are known as "soft foot" drill clamping attachments.

SUMMARY OF THE INVENTION

The "soft foot" clamping device for portable drills of the present invention positions a portable drill with respect to a work piece with a minimum of force. The device includes three main parts. The first part is a foot member. The foot member is designed to first provide a mounting for the portable drill and second to exert a force on the work piece. The foot member cooperates with a contact pad to positively hold the portable drill in position. Between the contact pad and the means for engaging the portable drill is a guide path.

Slidably located within the guide path is the second main part, a housing. Located within the housing is a mounting arrangement for a mechanism which provides either a vertical or rotational force. Also located within the housing is a collet which extends through the pilot hole into the work piece.

Located within the housing is the third main part, a mandrel drawing mechanism. The mandrel drawing mechanism is used to move a mandrel to expand the collet to fill the pilot hole.

When operated, the device for clamping portable drills of the present invention draws the mandrel into the collet. This in turn causes the housing to exert a force on the foot member. The foot member is then drawn toward the work piece. Because the foot member provides a mounting for the portable drill, it draws the portable drill toward the work piece. The clamping device of the present invention includes an anti-back drivable mechanism for applying a clamping load. This enables minimal clamping loads which results in a reduction of the opportunity for distortion or destruction of the work piece.

BRIEF DESCRIPTION OF THE DRAWINGS

A better understanding of the device of the present invention may be had by reference to the drawings wherein:

FIG. 1 is a cross-sectional view of the device of the present invention shown with the nose portion of a portable drill; and FIG. 2 is a section taken along line 2—2 of FIG. 1.

BRIEF DESCRIPTION OF THE EMBODIMENTS

By reference to FIGS. 1 and 2, it may be seen that the device 10 and method of the present invention for selectively clamping portable drill 104 to work piece 100 consists of three main parts.

The first main part is foot member assembly 20. Foot member assembly 20 includes contact pad 22 which is constructed to contact and apply pressure to surface 101 of work piece 100. Located at the opposite end of foot member assembly 20 from contact pad 22 is a hole or aperture 24 which is sized to accommodate lock nut 102 which is typically found on the end of portable drill 104. Between aperture 24 and contact pad 22 is located channel 26. Channel 26 is defined by the space 27 located between side rails 28 and 30. In sum, foot member assembly 20 is formed substantially in the shape of a U with side rails 28 and 30 forming the arms of the U.

Aperture 24 is formed adjacent base 29 of the U and contact pad 22 is under base 29 of the U. It is also to be noted that access slot 32 is formed in rail 30 along the side of foot member assembly 20. The purpose of access slot 32 will be explained shortly.

The second major part of the device for selectively clamping a portable drill to work piece is slidable housing 40. As shown in the preferred embodiment slidable housing 40 includes threads 42 for mounting a motor mechanism 80. While a rotating pneumatic or electric motor is employed in the preferred embodiment, it will be understood that any power source capable of generating torque may be used without departing from the scope of the invention. It will also be understood that a variety of other mounting means may be used without departing from the scope of the invention. Such means would include bolted flanges, welding, tapered interfitments or the like. The utilization of the motor assembly 80 will be explained in that portion of the disclosure which describes the operation of device 10.

Slidable housing 40 is sized so that it will move between rails 28 and 30. By specific reference to FIG. 2, it may be seen that slidable housing 40 is guided and retained by tongue and groove engagement 44 with rails 28 and 30. Located within and extending from slidable housing 40 is collet 46. Collet 46 is slidably mounted in hole 48 which is formed in base 49 of slidable housing 40.

The third major part of device 10 is mandrel drawing assembly 60. In the preferred embodiment of device 10, mandrel drawing assembly 60 includes internally threaded actuating nut 62. Actuating nut 62 includes arm 64 in which is located threaded hole 66. Threadably engaging hole 66 is mandrel 68. Locking mandrel 68 in position with respect to arm 64 is mandrel nut 52. Located between arm 64 and collet 46 is spring 70. The movement of the parts one with respect to the other to accomplish the desired clamping of a portable drill to a work piece will be explained in the section which follows.

Operation

The clamping device 10 of the present invention is secured to portable drill 104 by sandwiching base 29 of foot member assembly 20 between lock nut 102 and the nose piece portion of portable drill 104.

In the preferred embodiment, the power source for the clamping device 10 is a pneumatic or electric motor 80 which turns threaded drive screw 82. Drive screw 82 is held in position by engagement with guide hole 50 in base 49 of slidable housing 40. Actuating nut 62 which is located around and threadably engages drive screw 82 is prevented from rotating by contact with the interior 41 of slidable housing 40, but is free to move in an axial direction, as explained below.

Mandrel 68 is secured to actuating nut 62 by means of mandrel nut 52 and threads 66. Around mandrel 68 is expanding collet 46 which is biased away from actuating nut 62 by compression spring 70.

In order to use the clamping device 10 of the present invention, the user locates or drills a pilot hole 106 and then positions or mounts a drilling template 108 on work piece 100. Lock screw 54 is loosened and slidable housing 40 is free to move within channel 26 within foot member assembly 20. Lock screw 54 moves within access slot 32 formed in side rail 30. It will be understood that two access slots may be used, one in each side rail, or the access slot may be formed in rail 28. Expanding collet 46 is inserted into pilot hole 106 and portable drill 104 is positioned to drill a hole described by drill template 108. Motor 80 and drive screw 82 are then actuated to turn.

The rotation of motor 80 causes actuating nut 62 to move upwardly toward motor 80. Additionally, mandrel 68 is moved upwardly because of the force exerted on mandrel 68 by arm 64. When mandrel 68 moves upward, its tapered shoulder portion 67 engages expanding collet 46 which is being urged downwardly by spring 70. This causes taper 67 on mandrel 68 to be pulled up into the hollow portion of expanding collet 46, thus causing its diameter to increase. When surface 74 of mandrel 68 engages surface 84 of collet 46, collet 46 is carried upward with mandrel 68 until shoulder 110 on the end of collet 46 comes into contact with surface 111 of work piece 100. At this point, actuating nut 62 can no longer move upwardly so driven screw 82 and motor assembly 80 are pulled downward. Since motor assembly 80 is coupled directly to housing 40 and housing 40 is coupled directly to foot member assembly 20 by means of tongue and groove joints 44, a clamping force is now applied to lock nut 102 and the next hole can now be precisely drilled in the proper location by portable drill 104. Once a hole has been drilled in work piece 100, motor 80 is reversed to remove clamp load from lock nut 102. This allows lock nut 102 to be lifted out of aperture 112 of template 108 and drill 104 repositioned to where lock nut 102 is located in next aperture 113. The process can be repeated until the travel of unit 10 in foot assembly 20 is exceeded. At this point the whole unit must be repositioned and the process repeated.

The clamping force F2 which holds lock nut 102 against work piece 100 is determined by three factors. First, the distance L1 from contact pad 22 to the center line of mandrel 68; second, the distance L2 from contact pad 22 to the center line of portable drill 104; and, third, the force F1 applied by mandrel 68. The clamping force F2 holding lock nut 102 against work piece 100 may be mathematically determined by multiplying force F1 applied by mandrel 68 by the distance L1 from contact pad 22 to the center line of mandrel 68. The product of this force-distance combination is then divided by the distance L2 from contact pad 22 to the center line of drill 104. As the distance from contact pad 22 to the center line of mandrel 68 approaches the same length as the distance from contact pad 22 to the center line of drill 104, the force F2 applied to portable drill 104 approaches the force applied by mandrel 68. For example, if L1 equals 3", L2 equals 12" and F1 equals 400 pounds, then F2 equals F1 times L1 divided by L2 or 400 times 3 divided by 12 or F2 equals 100 pounds.

In the prior art, pneumatic pistons have been utilized to generate the force F1. Since pneumatic pistons can easily be back driven, these prior art designs must insure that force F2 always exceeds the drill thrust capacity of the portable drill. If F2 does not exceed the drill thrust capacity, then the drill bit will push the lock nut and the drill foot away from the work. This would result in poor hole quality and potential scrap. When high clamping forces are required, severe damage to the work piece may occur, particularly when the work piece is made of a soft material such as a composite or an aluminum. By utilizing an anti-backing drive screw mechanism instead of a pneumatic piston as shown in the preferred embodiment, the mandrel load can be significantly reduced. The load exerted by surface 110 of collet 48 against surface 111 of work piece 100 is now determined by the actual force of drilling, not the need to exceed the maximum thrust that drill 104 can generate. To drill a ¼ hole in aluminum requires approximately 40 pounds of thrust. If L1=3 inches and L2=12 inches then the force between surface 110 and surface 111 would be 160 pounds.

In prior art designs the clamp loads had to be such to resist the maximum thrust that drill 104 could generate. If this was 200 pounds with L1=3 inches and L2=12 inches the load between surface 110 and surface 111 would have to be 800 pounds, or 5 times that of the invention herein described.

There is now provided by the device and method of the present invention a system for clamping a portable drill to a work piece which uses a minimal amount of clamping force.

While the foregoing invention may further be described by reference to the appended claims, it will be understood by those of ordinary skill in the art that other means of solving the problem presented in the background of this invention may be constructed by reference to the device described in the specification and appended claims. Such devices shall fall within the scope of the appended claims.

I claim:

1. A device for selectively clamping a portable drill to a work piece comprising:
   a foot member, said foot member having:
      means for engaging the portable drill;

a contact pad for placing pressure on the surface of the work piece;

a substantially horizontal guide path;

a housing constructed and arranged to be positioned within said substantially horizontal guide path, said housing having:

mounting means for a source of rotational torque;

a hollow collet member constructed and arranged to extend outwardly from said housing;

means for expanding said hollow collet member contained within said housing, said means for expanding said hollow collet member having:

a mandrel constructed and arranged to pass through and expand said hollow collet member;

means for converting said rotational torque to substantially vertical movement of said mandrel;

whereby when said mandrel is moved in a substantially vertical direction, said hollow collet member is expanded and pressure is placed on the surface of the work piece by said contact pad, thus selectively positioning said means for engaging the portable drill with respect to the work piece.

2. A system for selectively clamping a portable drill having a nose portion engageable by a lock nut to a work piece, said system comprising:

a foot member, said foot member having:

means for engaging the nose piece on lock nut of the portable drill;

a contact pad for placing pressure of the surface of the work piece;

a substantially horizontal guide path;

a housing constructed and arranged to be lockably positioned within said substantially horizontal guide path, said housing having:

mounting means for a source of rotational torque;

a hollow collet member constructed and arranged to extend outwardly from said housing;

means for expanding said hollow collet member contained within said housing, said means for expanding said hollow collet member having:

a mandrel constructed and arranged to pass through and expand said hollow collet member;

means for converting said rotational torque to substantially vertical movement of said mandrel;

whereby when said mandrel is moved in a substantially vertical direction, said hollow collet member is expanded and pressure is placed on the surface of the work piece by said contact pad, thus selectively positioning said means for engaging the portable drill with respect to the work piece.

3. An attachment for selectively clamping a portable drill to a work piece and positioning said portable drill with respect to a pilot hole, said attachment comprising:

a substantially U-shaped foot member, said foot member having:

an opening engaging a lock nut on the nose of a portable drill, said opening being adjacent to the base of said U;

a contact pad positioned under the base of said U;

a channel formed in one of the arms of said U;

a housing constructed and arranged to slide between the arms of said U and lockably positioned with the foot member by the engagement of a lock screw with said channel formed in the arm of the said U;

a device for providing a rotational force;

means to position said device for applying a rotational force formed in said housing;

means for positioning a collet formed in said housing;

a mandrel constructed and arranged to expand said collet when said mandrel is moved vertically therein;

an activating nut constructed and arranged to impart a vertical force on said mandrel when acted upon by a rotating force; said mechanism being anti-back drivable;

whereby when said collet is placed through the pilot hole and the collet expanded by the movement of said mandrel, which mandrel is moved by the application of rotating force to said actuating nut, force will be exerted on said contact pad thus positively positioning the opening for engaging a portable drill with respect to the work piece.

* * * * *